(12) United States Patent
Cheng et al.

(10) Patent No.: US 6,967,795 B2
(45) Date of Patent: Nov. 22, 2005

(54) COLOR WHEEL

(75) Inventors: Chu-Ming Cheng, Hsinchu (TW);
Jiunn-Lih Lin, Hsinchu (TW);
Huang-Ming Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/117,345

(22) Filed: Apr. 29, 2005

(65) Prior Publication Data

US 2005/0219531 A1    Oct. 6, 2005

(30) Foreign Application Priority Data

Jun. 4, 2004    (TW) ................................ 093116286

(51) Int. Cl.$^7$ ................................................ G02B 5/22
(52) U.S. Cl. ...................... 359/891; 359/885; 348/743; 356/418; 353/84; 362/293
(58) Field of Search ................................ 359/885, 891, 359/889, 892; 348/743; 356/418; 353/84; 362/293

(56) References Cited

U.S. PATENT DOCUMENTS 6,879,451 B1 * 4/2005 Hewlett et al. ............. 359/891

* cited by examiner

*Primary Examiner*—Leonidas Boutsikaris
(74) *Attorney, Agent, or Firm*—Bacon & Thomas PLLC

(57) ABSTRACT

The present invention provides a color wheel including a motor and a color filter module. The color filter module includes a first color filter having a first transmittance and a second color filter having a second transmittance that is smaller than the first transmittance. 50% of the first transmittance is corresponding to a first light wavelength and a second light wavelength that is larger than the first light wavelength. The second color filter and the first color filter have substantially same hues. 50% of the second transmittance is corresponding to a third light wavelength and a fourth light wavelength that is larger than the third light wavelength. The second color filter satisfies a first condition chosen from the third light wavelength being larger than the first light wavelength or the second light wavelength being larger than the fourth light wavelength.

10 Claims, 4 Drawing Sheets

COLOR WHEEL

FIELD OF THE INVENTION

The present invention relates to a color wheel, and more particularly, to a color wheel in a projection apparatus.

BACKGROUND OF THE INVENTION

A color wheel is often disposed in a projection apparatus. The color wheel includes a motor and a color filter module. The color filter module is disposed on the motor and rotated by the motor. The color filter module includes a red, a green and a blue color filter for filtering three primary colors, and a digital micro-mirror device (DMD) is used together for adjusting the color contrast of projected images.

DMD belongs to a linear response display and therefore a gamma correction is needed for adjusting the color value. However, the gamma correction causes the gray scale to be quantified and then become discontinuous. In prior art, an error diffusion filter is used for solving the above drawback, but meanwhile apparent dither noise is shown in the gray scale of low brightness.

Please refer to FIG. 1. A conventional color filter module 10 includes two green color filters 12 with high transmittance, two red color filters 14 with high transmittance, two blue color filters 16 with high transmittance and further includes a green color filter 18 with low transmittance that is about 6%. Among the green gray scales displayed in the conventional color filter module 10, a green gray scale with high brightness is displayed by the two green color filters 12 with high transmittance; a green gray scale with middle brightness is displayed by the two green color filters 12 with high transmittance and the green color filter 18 with low transmittance; a green gray scale with low brightness is mainly displayed by the green color filter 18 with low transmittance. In such disposition, the problem of dither noise is solved.

Please refer to FIG. 2 that shows the spectrogram of each green color filter 12 with high transmittance and each green color filter 18 with low transmittance. Each green color filter 12 with high transmittance has a first transmittance 20. 50% of the first transmittance 20 is corresponding to a first light wavelength 22 and a second light wavelength 24, wherein the second light wavelength 24 is larger than the first light wavelength 22. The green color filter 18 with low transmittance has a second transmittance 26 that is smaller than the first transmittance 20. 50% of the second transmittance 26 is corresponding to a third light wavelength 28 and a fourth light wavelength 30, wherein the fourth light wavelength 30 is larger than the third light wavelength 28. In the conventional color filter module 10, the gray scale is displayed by two color filters of different transmittances, and the first light wavelength 22 must be equal to the third light wavelength 28 while the second light wavelength 24 must be equal to the fourth light wavelength 30 for preventing the gray scale from variation.

In practice, the coating technique of color filters nowadays for making the first light wavelength 22 equal to the third light wavelength 28 while the second light wavelength 24 equal to the fourth light wavelength 30 has low yield rate, high cost and production difficulty. Therefore, the condition for light wavelengths needs to be improved.

SUMMARY OF THE INVENTION

One objective of the present invention is to provide a color filter module of a color wheel for solving the above problems in prior art.

In the present invention, the first color filter and the second color filter have similar hues, and the second transmittance of the second color filter is smaller than the first transmittance of the first color filter. The second color filter is conformed to a first condition. The first condition is chosen from that the third light wavelength is larger than the first light wavelength or the second light wavelength is larger than the fourth light wavelength. The color filter module in the present invention can solve the problems of dither noise and variation in gray scale. In practice, the cost is low and the production is easy.

The present invention is a color wheel including a motor and a color filter module. The color filter module is disposed on the motor and rotated by the motor. The color filter module includes a plurality of color filters, and each color filter is for filtering a specific color. The plurality of color filters includes a first color filter and a second color filter. The first color filter has a first transmittance corresponding to a first spectrum relation about the transmittance and the light wavelength. In the first spectrum relation, 50% of the first transmittance is corresponding to a first light wavelength and a second light wavelength, wherein the second light wavelength is larger than the first light wavelength. The second color filter has a second transmittance corresponding to a second spectrum relation about the transmittance and the light wavelength. In the second spectrum relation, 50% of the second transmittance is corresponding to a third light wavelength and a fourth light wavelength, wherein the fourth light wavelength is larger than the third light wavelength. The hue of the second color filter is similar to that of the first color filter. The second transmittance is smaller than the first transmittance. The second color filter is conformed to a first condition chosen from that the third light wavelength is larger than the first light wavelength or the second light wavelength is larger than the fourth light wavelength.

The above and other objectives, advantages and features of the present invention will be understood from the following detailed description of the present invention when considered in connection with the accompanying drawing below.

DETAILED DESCRIPTION OF THE PREFERRED EMBODIMENT

Figure 1:
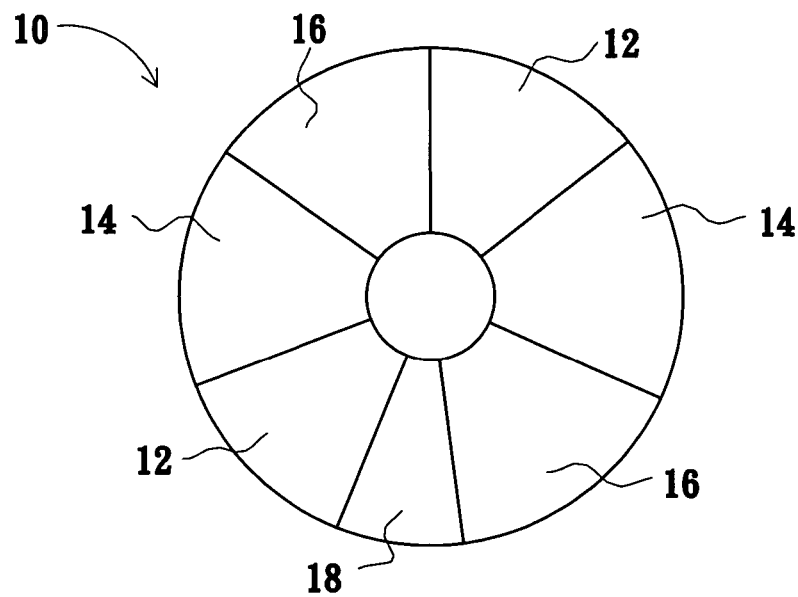
FIG. 1 is a schematic view showing a conventional color filter module.
Figure 2:
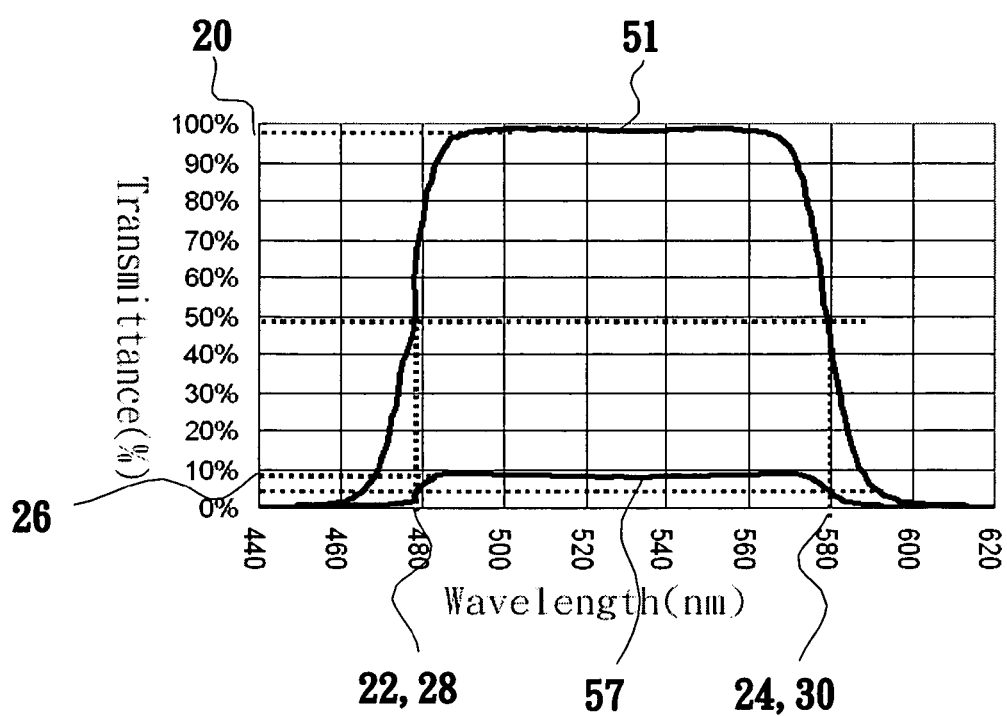
FIG. 2 is a spectrogram of each green color filter with high transmittance and each green color filter with low transmittance.
Figure 3:
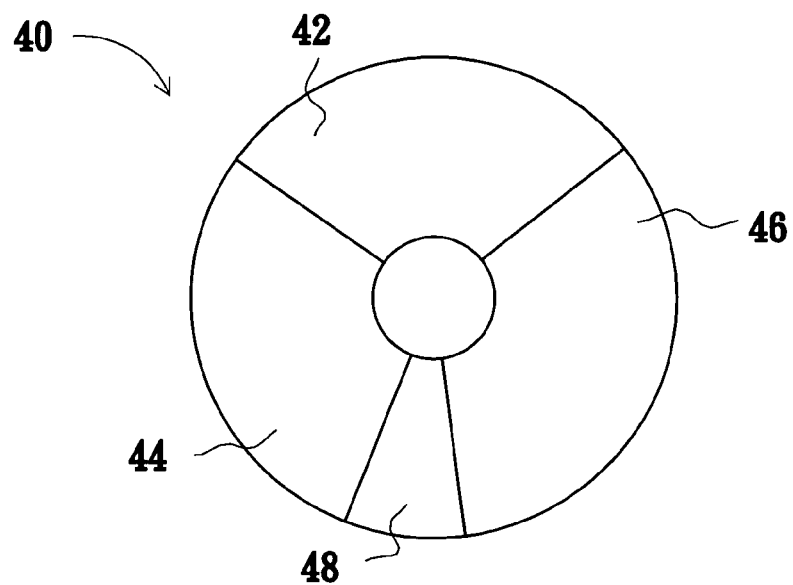
FIG. 3 is a schematic view showing the color filter module in the first preferred embodiment.

Please refer to FIG. 3. In the first preferred embodiment, the color filter module 40 includes a red color filter 42 with high transmittance, a green color filter 44 with high transmittance, a blue color filter 46 with high transmittance and a green color filter 48 with low transmittance. The red color filter 42 with high transmittance, the green color filter 44 with high transmittance, the blue color filter 46 with high transmittance and the green color filter 48 with low transmittance are sector plates with a same radius, and the central angles thereof are 108°, 104°, 118° and 30° respectively. The green color filter 44 with high transmittance is defined as a first color filter 44, and the green color filter 48 with low transmittance is defined as a second color filter 48.

Figure 4:
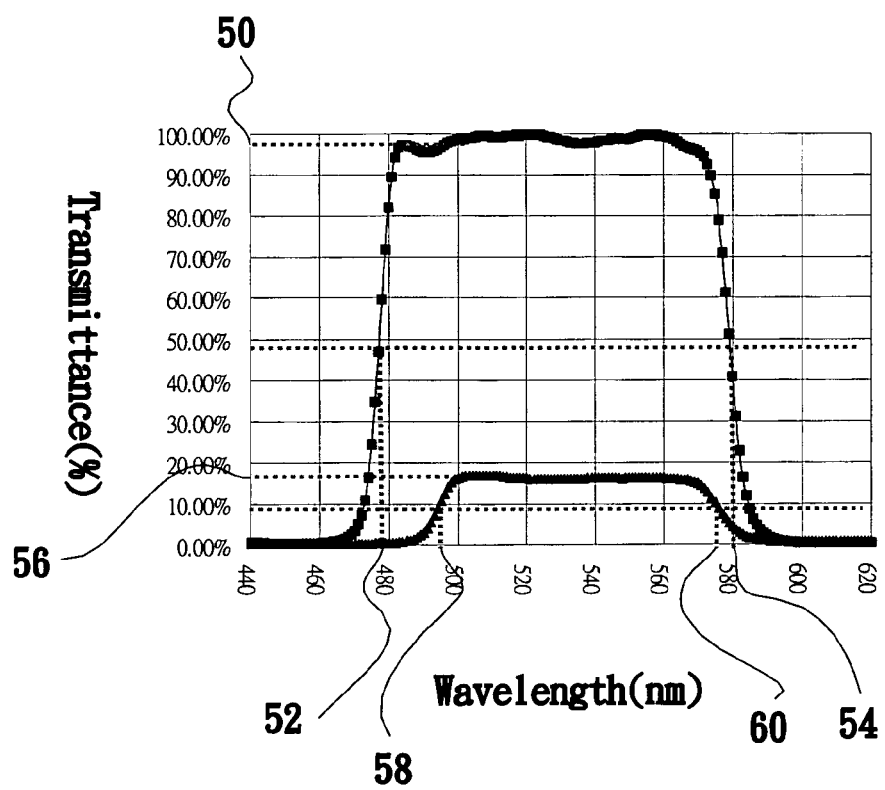
FIG. 4 is a spectrogram of the first color filter and the second color filter in the first preferred embodiment.

Please refer to FIG. 4 that shows the spectrogram of the first color filter 44 and the second color filter 48 in the first preferred embodiment. The first color filter 44 has a first transmittance 50 corresponding to a first spectrum relation 51 about the transmittance and the light wavelength. In the first spectrum relation 51, 50% of the first transmittance 50 is corresponding to a first light wavelength 52 that is about 480 nm and a second light wavelength 54 that is about 580 nm. The second color filter 48 has a second transmittance 56 corresponding to a second spectrum relation 57. In the second spectrum relation 57, 50% of the second transmittance 56 is corresponding to a third light wavelength 58 and a fourth light wavelength 60, and the fourth light wavelength 60 is larger than the third light wavelength 58. The hue of the second color filter 48 is similar to that of the first color filter 44. The second transmittance 56 is smaller than the first transmittance 50. The second color filter 48 is conformed to the first condition chosen from that the third light wavelength 58 is larger than the first light wavelength 52 while the second light wavelength 54 is larger than the fourth light wavelength 60.

Figure 5:
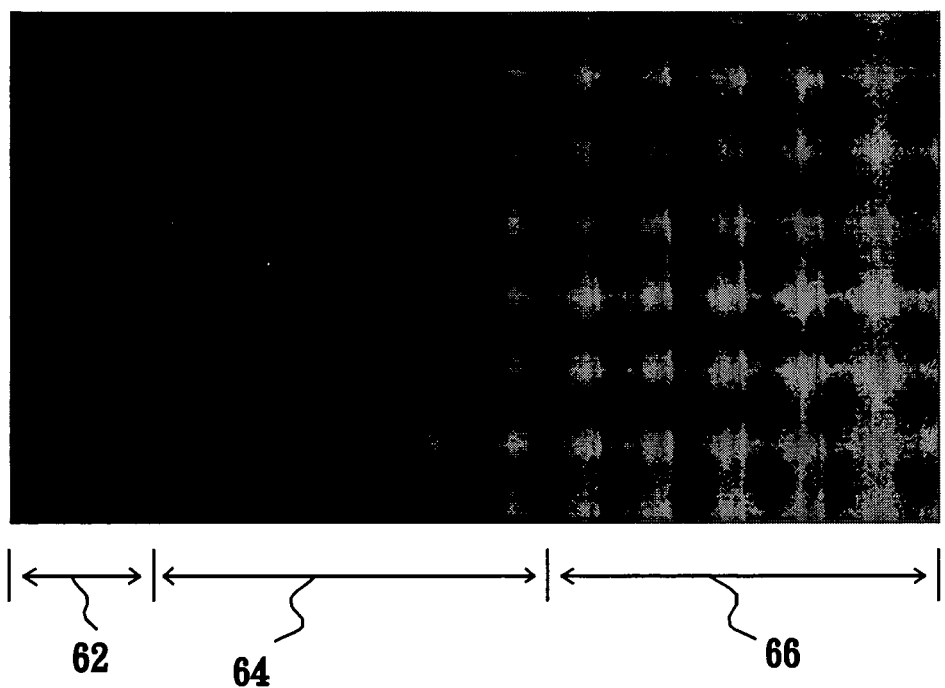
FIG. 5 is a schematic view showing the gray scale of the color filter module in the first preferred embodiment.

Please refer to FIG. 5 that shows the green gray scale of the color filter module 40 in the first preferred embodiment. In FIG. 5, a green gray scale section 66 with high brightness is presented by the first color filter 44; in other words, the proportion of the first color filter 44 is larger than that of the second color filter 48. A green gray scale section 68 with middle brightness is presented by the first color filter 44 and the second color filter 48; in other words, the proportion of the first color filter 44 is similar to that of the second color filter 48. A green gray scale section 62 with low brightness is mainly presented by the second color filter 48; in other words, the proportion of the first color filter 44 is smaller than that of the second color filter 48.

In the first preferred embodiment, the band-pass of the first spectrum relation 51 is larger than that of the second spectrum relation 57, which means that the hue of the second color filter 48 is purer than that of the first color filter 44. Thus, as the first color filter 44 and the second color filter 48 are used for generating the green gray scale section 62 with low brightness, the green gray scale section 62 with low brightness is smoother because of the larger proportion of the second color filter 48.

Figure 6:
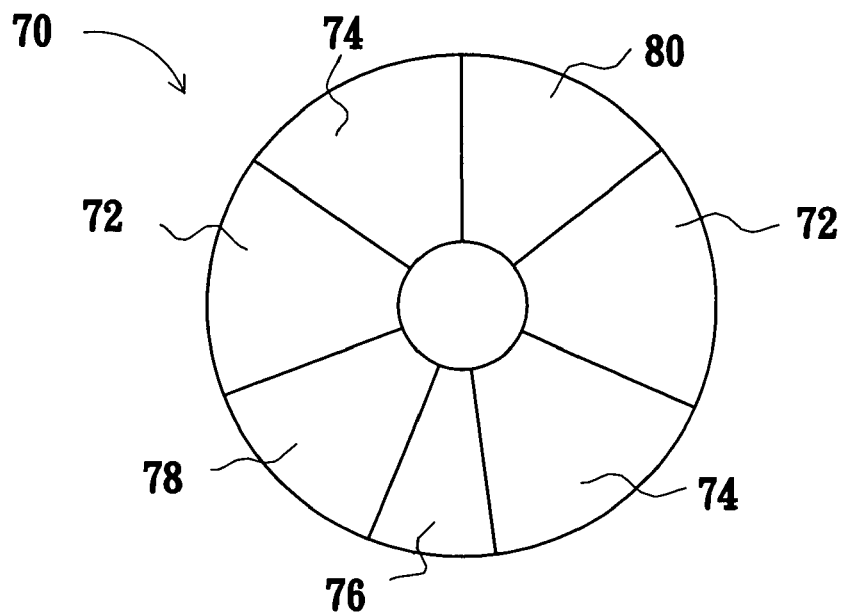
FIG. 6 is a schematic view showing the color filter module in the second preferred embodiment.

Please refer to FIG. 6 that shows the color filter module 70 in the second preferred embodiment. The color filter module 70 includes two red color filters 72 with high transmittance, two green color filters with high transmittance, two blue color filters 74 with high transmittance and a green color filter 76 with low transmittance. The two green color filters with high transmittance are defined as a first color filter 78 and a third color filter 80. The green color filter 76 with low transmittance is defined as a second color filter 76. Each of the two red color filters 72 with high transmittance, each of the two green color filters with high transmittance, each of the two blue color filters 74 with high transmittance and the green color filter 76 with low transmittance are sector plates with a same radius, and the central angles thereof are 54°, 52°, 59° and 30° respectively.

Figure 7:
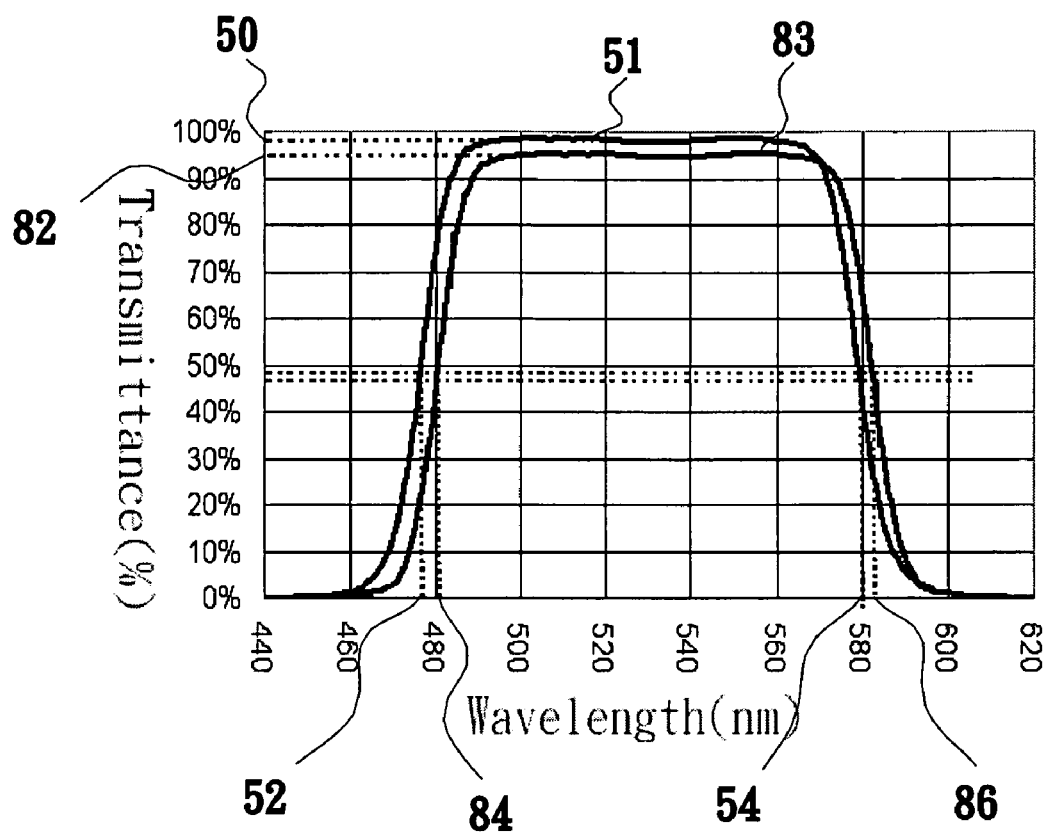
FIG. 7 is a spectrogram of the first color filter and the third color filter in the second preferred embodiment.

Please refer to FIG. 7 that shows the spectrogram of the first color filter 78 and the third color filter 80 in the second preferred embodiment. The first color filter 78 in the second preferred embodiment is the same as the first color filter 44 in the first preferred embodiment except the central angle of the sector plate. The third color filter 80 has a third transmittance 82 corresponding to a third spectrum relation 83 about the transmittance and the light wavelength. In the third spectrum relation 83, 50% of the third transmittance 82 is corresponding to a fifth light wavelength 84 and a sixth light wavelength 86 that is larger than the fifth light wavelength 84. The hue of the third color filter 80 is similar to that of the first color filter 78, while a second condition and a third condition must be conformed, wherein the second condition is that the absolute value of the difference between the fifth light wavelength 84 and the first light wavelength 52 is smaller or equal to 4 nm while the absolute value of the difference between the sixth light wavelength 86 and the second light wavelength 54 is smaller or equal to 4 nm, and the third condition is that the absolute value of the difference between the third transmittance 82 and the first transmittance 50 is smaller or equal to 4%.

As experiment shows, if the first color filter 78 and the third color filter 80 are not conformed to the second condition and the third condition, dither noise and the non-smooth gray scale will occur when the first color filter 78 and the third color filter 80 are used for generating the green gray scale.

Please refer to FIG. 4 again. The second color filter 76 in the second preferred embodiment is the same as the second color filter 48 in the first preferred embodiment. Thus, the second color filter 76 in the second preferred embodiment must be conformed to the first condition in the first preferred embodiment too.

In another preferred embodiment (not shown in the figure), if the dither noise, variation in color and non-smooth gray scale of the red gray scale are to be solved, one can use the principle of the first or the second preferred embodiment without the third color filter 80 and only needs to define the red color filter 42 with high transmittance as the first color filter 44 and substitute the green color filter 48 with low transmittance with a red color filter with low transmittance defined as the second color filter 48 and conformed to the first condition. Further, if a third color filter 80 is included, the two red color filters 72 are defined as the first color filter 78 and the third color filter 80 while the green color filter 76 with low transmittance is substituted by a red color filter with low transmittance defined as the second color filter 76 and conformed to the first, the second and the third conditions.

Using the same principal in still another preferred embodiment (not shown in the figures), if the dither noise, variation in color and non-smooth gray scale of the blue gray scale are to be solved without the third color filter 80, one only needs to define the blue color filter 46 with high transmittance as the first color filter 44 and substitute the green color filter 48 with low transmittance with a blue color filter with low transmittance defined as the second color filter 48 and conformed to the first condition. Further, if a third color filter 80 is included, the two blue color filters 74 are defined as the first color filter 78 and the third color filter 80 while the green color filter 76 with low transmittance is substituted by a blue color filter with low transmittance defined as the second color filter 76 and conformed to the first, the second and the third conditions.

In the present invention, the first transmittance 50 of the first color filters 44 and 78 is larger than the second transmittance 56 of the second color filters 48 and 76. The first color filters 44 and 78 and the second color filters 48 and 76 are conformed to the first condition that the third light wavelength 58 is larger than the first light wavelength while the second light wavelength 54 is larger than the fourth light wavelength 60. The first color filters 44, 78 and the third color filter 80 are conformed to the second condition and the third condition, wherein the second condition is that the absolute value of the difference between the fifth light wavelength 84 and the first light wavelength 52 is smaller or equal to 4 nm while the absolute value of the difference between the sixth light wavelength 86 and the second light wavelength 54 is smaller or equal to 4 nm, and the third condition is that the absolute value of the difference between the third transmittance 82 and the first transmittance 50 is smaller or equal to 4%. The color filter modules 40 and 70 in the present invention can solve the problems of dither noise, non-smoothness and variation of gray scale. In practice, the cost is low and the production is easy.

Although the invention has been described in detail herein with reference to its preferred embodiments, it is to be understood that this description is by way of example only, and is not to be interpreted in a limiting sense. It is to be further understood that numerous changes in the details of the embodiments of the invention, and additional embodiments of the invention, will be apparent, and may be made by, persons of ordinary skill in the art having reference to this description. It is considered that such changes and additional embodiments are within the spirit and true scope of the invention as claimed below.

What is claimed is:

1. A color wheel, comprising:
   a motor; and
   a color filter module disposed on the motor and rotated by the motor, the color filter module having a plurality of color filters, each of the color filters filtering a specific color, the plurality of color filters comprising:
   a first color filter having a first transmittance, 50% of the first transmittance being conformed to a first light wavelength and a second light wavelength, the second light wavelength being larger than the first light wavelength; and
   a second color filter having a second transmittance, 50% of the second transmittance being conformed to a third light wavelength and a fourth light wavelength, the fourth light wavelength being larger than the third light wavelength, wherein the second color filter and the first color filter have substantially same hues, the second transmittance being smaller than first transmittance, the second color filter being conformed to a first condition, the first condition being chosen from the third light wavelength being larger than the first light wavelength or the second light wavelength being larger than the fourth light wavelength.

2. The color wheel according to claim 1, wherein the hues of the first color filter and the second color filter are substantially green.

3. The color wheel according to claim 1, wherein the hues of the first color filter and the second color filter are substantially blue.

4. The color wheel according to claim 1, wherein the hues of the first color filter and the second color filter are substantially red.

5. The color wheel according to claim 1, wherein the second color filter is a sector plate and the central angle thereof is about 30°.

6. The color wheel according to claim 1, wherein the color filter module further comprises a third color filter, the third color filter and the first color filter having substantially same hues, the third color filter having a third transmittance, the absolute value of the difference between the third transmittance and the first transmittance being smaller or equal to 4%.

7. The color wheel according to claim 6, wherein 50% of the third transmittance is conformed to a fifth light wavelength and a sixth light wavelength, the sixth light wavelength being larger than the fifth light wavelength, the third color filter being conformed to a second condition, the second condition being chosen from the absolute value of the difference between the fifth light wavelength and the first light wavelength being smaller or equal to 4 nm or the absolute value of the difference between the sixth light wavelength and the second light wavelength being smaller or equal to 4 nm.

8. The color wheel according to claim 7, wherein the second condition is the absolute value of the difference between the fifth light wavelength and the first light wavelength being smaller or equal to 4 nm and the absolute value of the difference between the sixth light wavelength and the second light wavelength being smaller or equal to 4 nm.

9. The color wheel according to claim 6, wherein the first color filter and the third color filter are sector plates with a same radius and the angles thereof are about 52°.

10. The color wheel according to claim 1, wherein the first condition is the third light wavelength being larger than the first light wavelength and the second light wavelength being larger than the fourth light wavelength.

* * * * *